(12) United States Patent
Ahmed et al.

(10) Patent No.: US 10,349,337 B2
(45) Date of Patent: *Jul. 9, 2019

(54) BANDWIDTH ALLOCATION

(71) Applicant: Facebook, Inc., Menlo Park, CA (US)

(72) Inventors: Nabeel Ahmed, San Jose, CA (US); Djordje Tujkovic, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,805

(22) Filed: Sep. 17, 2018

(65) Prior Publication Data

US 2019/0021042 A1    Jan. 17, 2019

Related U.S. Application Data

(63) Continuation of application No. 15/255,355, filed on Sep. 2, 2016, now Pat. No. 10,110,494.

(51) Int. Cl.
| | |
|---|---|
| *H04W 40/34* | (2009.01) |
| *H04L 12/803* | (2013.01) |
| *H04L 12/801* | (2013.01) |
| *H04W 28/02* | (2009.01) |
| *H04W 8/00* | (2009.01) |
| *H04W 72/04* | (2009.01) |
| *H04W 88/12* | (2009.01) |
| *H04W 84/18* | (2009.01) |

(52) U.S. Cl.
CPC .......... *H04W 40/34* (2013.01); *H04L 47/125* (2013.01); *H04L 47/17* (2013.01); *H04W 8/00* (2013.01); *H04W 28/0268* (2013.01); *H04W 72/0453* (2013.01); *H04W 84/18* (2013.01); *H04W 88/12* (2013.01)

(58) Field of Classification Search
CPC ... H04W 40/34; H04W 8/00; H04W 28/0268; H04L 47/17; H04L 47/125
See application file for complete search history.

(56) References Cited

U.S. PATENT DOCUMENTS

| | | | |
|---|---|---|---|
| 5,914,950 A | 6/1999 | Tiedemann, Jr. et al. | |
| 6,947,490 B1 | 9/2005 | Edwards et al. | |
| 7,646,752 B1 * | 1/2010 | Periyalwar | H04L 41/044 370/216 |
| 7,773,559 B2 | 8/2010 | Chen et al. | |
| 8,077,665 B2 | 12/2011 | Murugesu et al. | |
| 8,855,006 B2 | 10/2014 | Gloss | |
| 10,110,494 B2 * | 10/2018 | Ahmed | H04W 8/00 |
| 2005/0048978 A1 | 3/2005 | Santhoff et al. | |
| 2006/0274679 A1 * | 12/2006 | Khandekar | H04L 5/0026 370/278 |

(Continued)

*Primary Examiner* — Mohammad S Anwar
(74) *Attorney, Agent, or Firm* — Brian R. Short

(57) ABSTRACT

Apparatuses, methods, and systems for allocating capacity for links of a multi-hop distributed network are disclosed. One method includes allocating capacity, by a central controller, for each link of a plurality of links of a sector of a wireless network based at least in part on a number of devices directly or indirectly wirelessly connected to the sector, providing the allocated capacity for each link to the sector, and adjusting, by the sector, the allocated capacity for at least one link of the plurality of links of the sector.

19 Claims, 7 Drawing Sheets

(56) References Cited

U.S. PATENT DOCUMENTS

2008/0139216 A1* 6/2008 Lee .................. H04W 28/20
                                                455/452.2
2008/0159316 A1   7/2008 Dutt et al.
2008/0225737 A1   9/2008 Gong et al.

* cited by examiner

BANDWIDTH ALLOCATION

RELATED APPLICATIONS

This patent application is a continuation of U.S. patent application Ser. No. 15/255,355, filed Sep. 2, 2016, which in herein incorporated by reference.

FIELD OF THE DESCRIBED EMBODIMENTS

The described embodiments relate generally to wireless communications. More particularly, the described embodiments relate to systems, methods and apparatuses of central and distributed control of bandwidth allocations of links of a sector within a wireless network.

BACKGROUND

Multi-hop wireless networks include multiple nodes wherein wireless links are formed between the nodes. Efficient usage of the bandwidth of wireless links between the nodes is needed for high performance of multi-hop wireless networks.

It is desirable to have methods apparatuses, and systems allocating available bandwidth amongst links of a multi-hop network.

SUMMARY

An embodiment includes a method. The method includes allocating, by a central controller, a capacity for each link of a plurality of links of a sector of a wireless network based at least in part on a number of devices connected to the sector through one wireless hop and connected to the sector through a plurality of wireless hops, wherein allocating the capacity includes allocating a frequency bandwidth available for use by each link of the plurality of links of the sector for wireless communication based on network information sensed and feedback to the central controller, providing the allocated capacity for each link to the sector, and adjusting, by the sector, the allocated capacity for at least one link of the plurality of links of the sector based on network information sensed by the sector and used by the sector to adjust the capacity allocation, wherein the adjusting of the allocated capacity is more responsive than the allocating of the capacity.

Another embodiment includes a system. The system includes a plurality of sectors, each sector including a transceiver for wirelessly communicating, and a central controller, wherein the central controller is directly or indirectly connected to at least one sector of the plurality of sectors. The central controller is configured to allocate a capacity for each link of a plurality of links of a sector of a wireless network based at least in part on a number of devices connected to the sector through one wireless hop and connected to the sector through a plurality of wireless hops, wherein allocating the capacity includes allocating a frequency bandwidth available for use by each link of the plurality of links of the sector for wireless communication based on network information sensed and feedback to the central controller, and wherein the central controller provides the allocated capacity for each link to the at least one sector. Further, the at least one sector is operative to adjust the allocated capacity for at least one link of the plurality of links of the sector based on network information sensed by the sector and used by the sector to adjust the capacity allocation, wherein the adjusting of the allocated capacity is more responsive than the allocating of the capacity.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for centrally allocating a capacity of links of a sector of a wireless network, and further adjusting the allocated capacity by the sector. For at least some embodiments, the adjustment of the allocated capacity by the sector is more responsive than the central allocation of the capacity. That is, for at least some embodiments, the sector performs capacity adjustments based on parameters determined at the sector whereas the central controller allocates the capacity based on parameters obtained elsewhere within the wireless network. Accordingly, the sector can respond more quickly (that is, before) to changes or conditions of the wireless network based on the parameters determined at the sector than the central controller can respond to the parameters obtained elsewhere within the wireless network.

Figure 1:
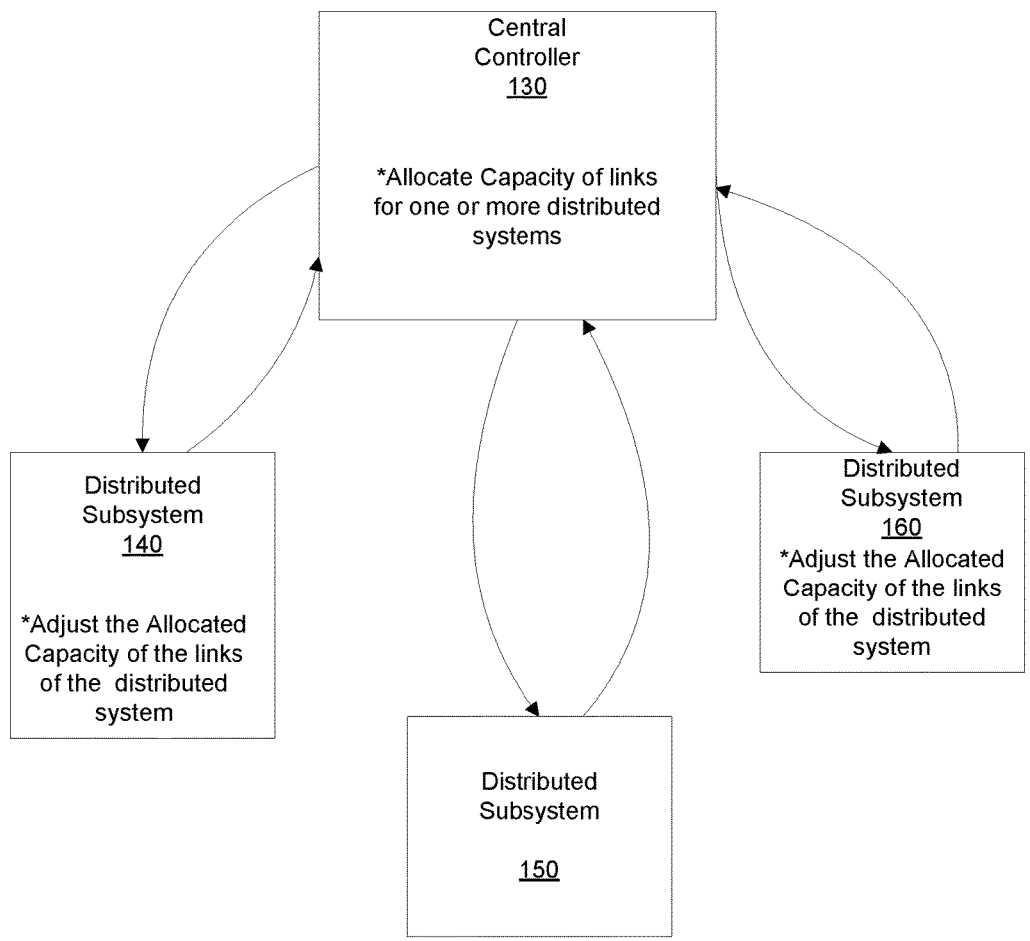
FIG. 1 shows a central controller and distributed systems, according to an embodiment.

FIG. 1 shows a central controller 130 and distributed systems 140, 150, 160, according to an embodiment. As shown, the central controller 130 allocates a capacity of multiple links of one or more of the distributed systems 140, 150, 160. For an embodiment, one or more of the distributed systems 140, 150, 160 include multiple sectors and multiple wireless links formed between the sectors.

It is to be understood that while the embodiments described include sectors, the term sectors can alternatively be referred to as nodes. That is, for an embodiment, a sector includes omnidirectional transmission, and for other embodiments, the sector includes directional or sectioned transmission. For an embodiment, the sectors each include one or more radios that form omnidirectional or directional links.

For an embodiment, the capacity includes a frequency capacity and allocating or selecting the capacity of a link includes selecting or allocating a frequency bandwidth available for use by the link of a sector for wireless communication. For an embodiment, this includes allocating one or more of available transmission channels. For an embodiment, this includes an allocation of a size (bandwidth) of a transmission channel. For an embodiment, the capacity includes a time capacity and allocating or selecting the capacity of a link includes selecting or allocating a time period of one or more time slots available for use by the link of the sector for wireless communication. For an embodiment, the capacity includes both time capacity and frequency capacity.

For at least some embodiments, the central controller 130 utilizes network level information to compute an assignment of allocations of capacity between the links at a plurality of wireless hops within one or more of the distributed systems 140, 150, 160. For an embodiment, at least one of the distributed systems 140, 150, 160 includes a plurality of nodes that are connected through wireless links. For at least some embodiments, the nodes include one or more sectors, wherein the wireless links are formed between the sectors. For an embodiment, the central controller allocates a capacity for each link of a plurality of links of a sector of a wireless network. The sector may include multiple links, and the central controller allocates a capacity for each link of the sector.

For at least some embodiments, the network level information includes a number of devices directly or indirectly wirelessly connected to the sector, and the central controller allocates a capacity for each link of a plurality of links of a sector of a wireless network based at least in part on a number of devices directly or indirectly wirelessly connected to the sector. For an embodiment, the devices include one or more other nodes, sectors and/or client (user) devices. For an embodiment, the devices include downstream devices.

For at least some embodiments, one or more of the distributed systems 140, 150, 160 receive the allocated capacities of the links of the distributed system, and the distributed system then adjusts the allocated capacities based on network information obtained at the distributed system. For an embodiment, the adjusting by the distributed systems 140, 150, 160 is more responsive than the capacity selection of the central controller 130 due to the sector adjusting the capacity allocation based on network information determined or directly available at the sector. That is, for at least some embodiments, the distributed systems 140, 150, 160 performs capacity allocation adjustments based on available network information before the central controller 130 reselects the capacity allocation based on available network information.

Figure 2:
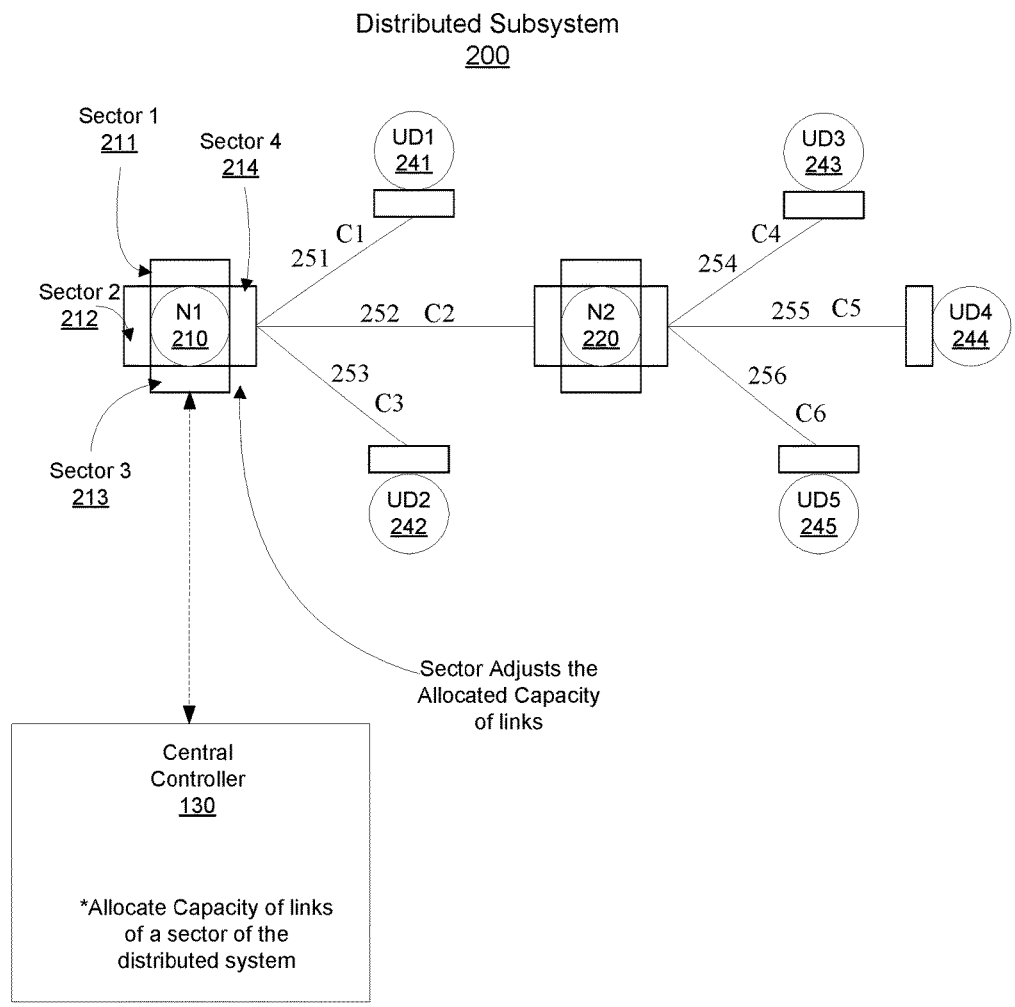
FIG. 2 shows a multi-hop wireless distributed system, according to an embodiment.

FIG. 2 shows a multi-hop wireless distributed system 200, according to an embodiment. As shown, the central controller 130 allocates a capacity for links of a sector 214 of a node N1 210 of the distributed system 200. For an embodiment, the node includes sectors 211, 212, 213, 214. Further, the sector 214 has multiple links formed between the sector 214 and a first user device (UD1) 241, and downstream node 220, and a second user device (UD2) 242.

Generally stated, the distributed system 200 includes a plurality of sectors (such as sector 214), wherein each sector includes a transceiver for wirelessly communicating. The distributed system 200 further includes a central controller 130, wherein the central controller 130 is directly or indirectly connected to at least one sector of the plurality of sectors.

The central controller 130 is operative to allocate a capacity for each link of a plurality of links of the at least one sector (such as, sector 214) based at least in part on a number of devices (such as, devices 241, 242, 243, 244, 245, and even node 220) directly or indirectly wirelessly connected to the at least one sector. The central controller 130 is operative to provide the selected capacity allocation for each link to the at least one sector. The at least one sector is configured to adjust the capacity allocation for the at least one link of the plurality of links of the sector.

As previously stated, it is to be understood that while the embodiments described include sectors, the term sectors can alternatively be referred to as nodes. That is, for an embodiment, a sector includes omnidirectional transmission, and for other embodiments, the sector includes directional or sectored transmission. For an embodiment, each sector includes one or more radios that support wireless links with directional or omni-directional.

The downstream node 220 includes a sector that includes links to a third user device (UD3) 243, a fourth user device (UD4) 244, and a fifth user device (UD5) 245.

For an embodiment, the central controller 130 allocates a capacity of the links of the sector 214 based at least in part on a number of downstream devices directly or indirectly wirelessly connected to the sector. For an embodiment, the downstream devices include the user devices 241, 242, 243, 244, 245. For an embodiment, the downstream devices include the user devices 241, 242, 243, 244, 245 and the node 220.

As previously stated, for an embodiment, the central controller allocates the capacity for links of the sector based at least in part on the number of downstream devices connected (directly, or indirectly through multiple wireless hops) to the sector. For example, if there are 5 downstream client devices 241, 242, 243, 244, 245 directly or indirectly connected to the sector 214, the central controller may select capacities of the links 251, 252, 253 of the sector 214 to be capacity C1=⅕ the available capacity, capacity ⅗ of the available capacity, and capacity C3=⅕ of the available capacity. That is, the link 251 supports ⅕ of the client devices, link 252 supports ⅗ of the client devices, and link 253 supports ⅕ of the client devices. Further, the central controller may allocate the capacities of C4 C5, and C6 of the links 254, 255, 256 to each be ⅓ as allocated for the links at Node N2 220.

As will be described, for at least some embodiments, the central controller additionally uses other network parameters and/or conditions to allocate the capacity for each of the link of the one or more of the sectors.

However, the traffic conditions and/or user connectivity may change during operation of the wireless network. Accordingly, for an embodiment, the sector 214 further adjusts the capacity of each of its links. For an embodiment, the capacity adjustment by the sectors is based at least in part on the traffic conditions and/or user connectivity.

For an embodiment, in the absence of traffic information, a per-hop capacity allocation (A) for each user device $(U_1, \ldots U_n)$ can be given as:

$$A_k = U_k \Big/ \sum_{i=0}^{N} U_i,$$

where N is the total number of user devices that share a wireless hop.

A vector $\{A1 \ldots An\}$ can be determined as a percentage of bytes or time depending upon the desired configuration.

For an embodiment, for each link, per user bandwidth requirements are accumulated to realize a bandwidth allocation vector $\{C1 \ldots Cn\}$ as follows:

$$C_i = \sum_{k=0}^{M} A_k,$$

where M is the total number of user devices served by link $L_i$.

For at least some embodiments, the sector includes a link-layer scheduler that uses the bandwidth allocation vector {C1 ... Cn}. For an embodiment, the sector assigns the bandwidth allocation $C_I$ to a link $L_I$ if there is sufficient traffic to utilize the allocated capacity. For an embodiment, the sector partially assigns $C_I$ to $L_I$ and assigns the remaining capacity to one or more links $L_J$'s whose demand is higher than their allocated $C_J$'s, which gives rise to multiplexing gain. That is, if the traffic of $L_I$ does not utilize a portion of the capacity allocated to $L_I$, then the sector can adjust the capacity allocated to $L_I$ based on the portion of the capacity allocated to $L_I$. The sector can then reassign this portion to another link $L_J$ of the sector that has higher traffic demands than the link $L_I$.

For at least some embodiments, the communication of the sector is scheduled. For an embodiment, the scheduled communication sets time and/or frequency blocks for transmission and reception of traffic through each of the links of the sector. For an embodiment, the sector receives the selected capacity allocation from the central controller, and accordingly, the communication of traffic through the links is scheduled based on the selected capacity allocation. For an embodiment, the sector adjusts the capacity allocation by adjusting the scheduled time and frequency blocks of the scheduled communication of traffic through the links of the sector.

For at least some embodiments, the central controller provides a tuple {$C_i$, $Min_i$, $Max_i$} per link to each sector of each node. $C_i$ is the selected capacity allocation as described, $Min_i$ is a minimum capacity allocation required to keep the link $L_i$ active, and $Max_i$ is the maximum capacity allocation for the link Li to prevent the link from taking a disproportionately large amount of the bandwidth capacity under congested conditions. For example, when the sector has more traffic to send than the available link capacity. Min and Max are set or determined based on upon implementation.

Figure 3:
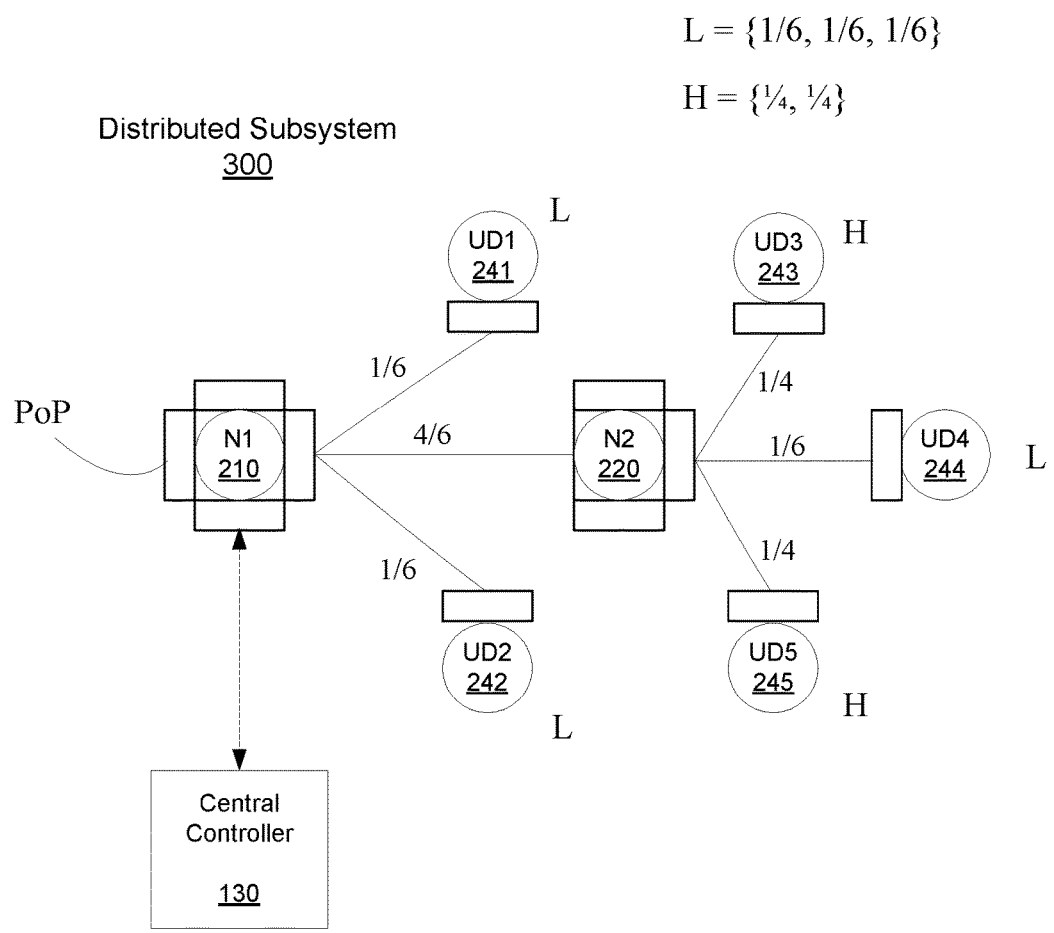
FIG. 3 shows a multi-hop wireless distributed system wherein device priorities influence capacity allocation, according to another embodiment.

FIG. 3 shows a multi-hop wireless distributed system wherein device priorities influence capacity allocation, according to another embodiment. For at least some embodiments, selecting the allocated capacity additionally includes a user device priority. For example, user device priorities can be set to high, medium and low. The capacity allocation is influenced by the set priorities of the client devices. As shown, user devices 243, 245 have been assigned a high priority (H), whereas the user devices 241, 242, 244 have been assigned a low priority (L). Accordingly, the assigned capacities reflect the priorities. That is, the central controller allocates the high priority user devices 243, 245 with greater capacity (¼) than the capacity (⅙) of the low priority user devices 241, 242, 244. The node N1 may be connected to a PoP (point of presence).

For at least some embodiments, the device priorities are configured by a network administrator (through a management interface) and thereby conveyed/known to the central controller. Accordingly, for an embodiment, the central controller computes capacity allocations and provides allocations similarly to the approach described above, using the 3-tuple. For an embodiment, the sectors are not allowed to use priorities directly to make adjustments.

For at least some embodiments, at least one link of the sector includes multiple queues. That is, for an embodiment, a link may be sectored into a plurality of queues, wherein each queue may have its own requirements. Therefore, the allocation selection becomes a queue dependent process rather than just a link dependent process.

Further, the central controller additionally allocates the capacity for each of the queues, and the sector further adjusts the capacity allocation. For at least some embodiments, the capacity allocations of each queue is adjusted based on traffic type, QoS (quality of service), and/or a hop count of a device being serviced by the queue.

For at least some embodiments, routing selections are performed for the devices (particularly downstream devices) directly or indirectly connected to a sector. That is, for a multi-hop network different paths (wherein a path includes multiple wireless hops) can be selected to indirectly connect the device to the sector. There are many different ways in which the routing can be accomplished. For example, the routing selections can be centralized or de-centralized. Different routing selections can result in different numbers of devices being directly and/or indirectly connected to the sector. Accordingly, the capacity selection of the central controller for the sector should and eventually will change. For at least some embodiments, determination of a routing selection of devices directly or indirectly connected to the sector triggers the central controller to reselect the capacity allocation of the sectors. That is, for an embodiment, the central controller reselects the capacity allocations to links of the sector when routes from or through the sector change. The routes can change due to link failures and/or congestion.

Further, for an embodiment, the central controller re-allocates the capacity to links of the sector based on traffic pattern changes across the links of the sector. The re-allocation of the capacity may re-distribute the capacity allocations across nodes or sectors to prevent unfairness across the network. For an embodiment, Fairness can be defined as an equal allocation of bandwidth and or time to each user.

Figure 4:
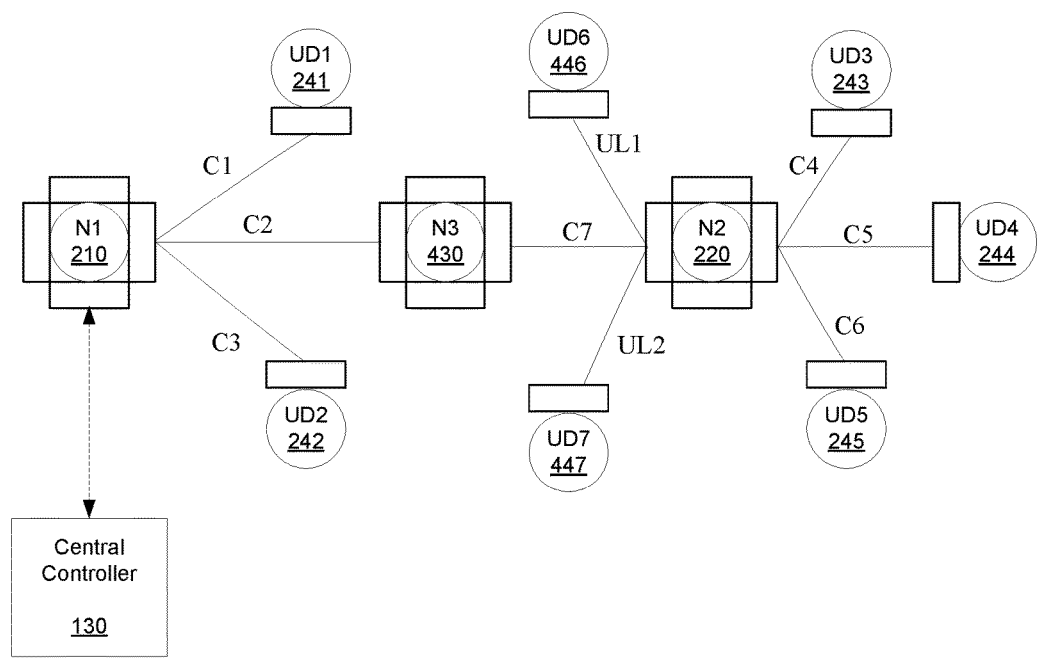
FIG. 4 shows a multi-hop wireless distributed system, according to another embodiment.

FIG. 4 shows a multi-hop wireless distributed system, according to another embodiment. Here, uplink traffic UL1, UL2 of user devices (UD6, UD7) 446, 447 of the device is considered in selecting and/or adjusting the capacity allocation of the sector. This network further includes another node N3 430. For an embodiment, the uplink traffic influences at least one of the capacity allocation selected by the central controller or the capacity allocation adjustment by the sector. The uplink traffic from user devices UD6 446 and UD7 447 share the bandwidth with downlink traffic from node N3 430 to node N2 220. Hence, the capacity allocation for downstream traffic for node N3 430 needs to be reduced to account for uplink traffic for UD6 and UD7, which can reduce the capacity allocation for downstream user devices directly or indirectly connected to node N3 430.

Figure 5:
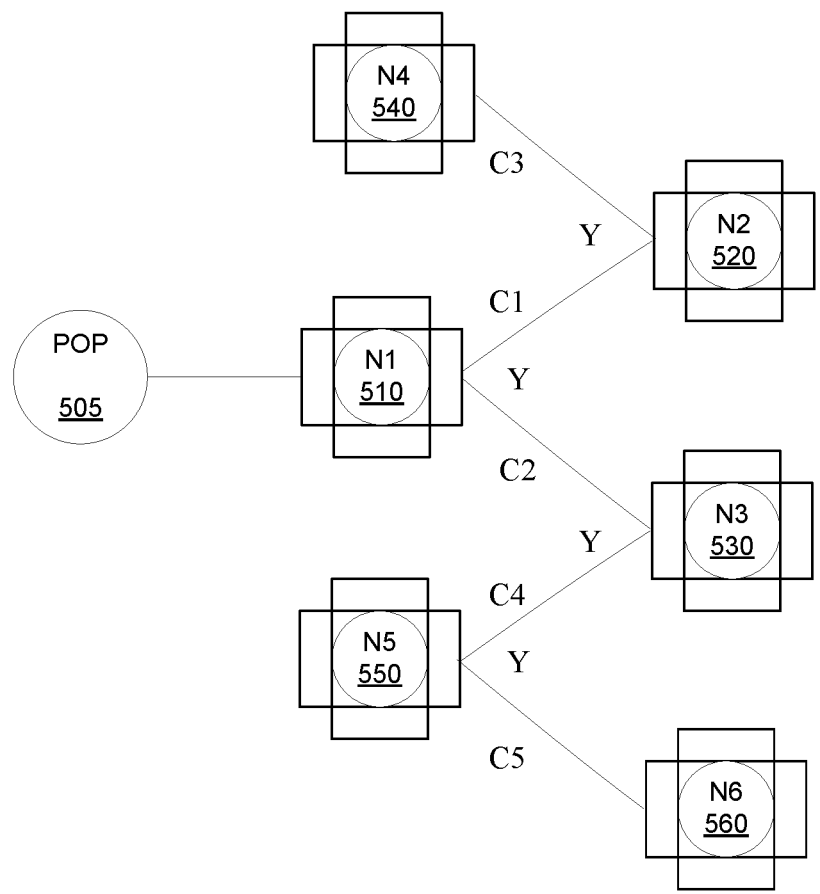
FIG. 5 shows a multi-hop wireless distributed system, according to another embodiment.

FIG. 5 shows a multi-hop wireless distributed system, according to another embodiment. The wireless network configuration of FIG. 5 includes several Y streets. For example, a sector of node N1 510 supports a path to a sector of node N2 520 and to a sector of node N3 530. The node N1 510 can be connected, for example, to a PoP 505. Further, a sector of node N2 520 supports a path to the sector of node N1 510, and to a sector of node N4 540. Further, a sector of node N3 530 supports a path to the sector of node N1 510, and to a sector of node N5 550. A sector of node N5 550 supports a path to a sector of node N3 530, and to a sector of node N6 560. Without some sort of central control of the allocations of the capacities of links, the existence of the Y streets can require the sectors of the links to exchange allocations of capacities due to the fact that the sectors are interconnected.

In some situations, the depicted Y streets of FIG. 5 require link layer schedulers to exchange information across multiple hops. For example, the selection for the allocated capacities C1 and C2 of the node N1 510 effects or influences the allocated capacities of the node N2 520. Due to this influence, the sectors need to exchange allocation capacities. However, with the allocated capacity being performed by the central controller, this exchange is not required or can be minimized.

Figure 6:
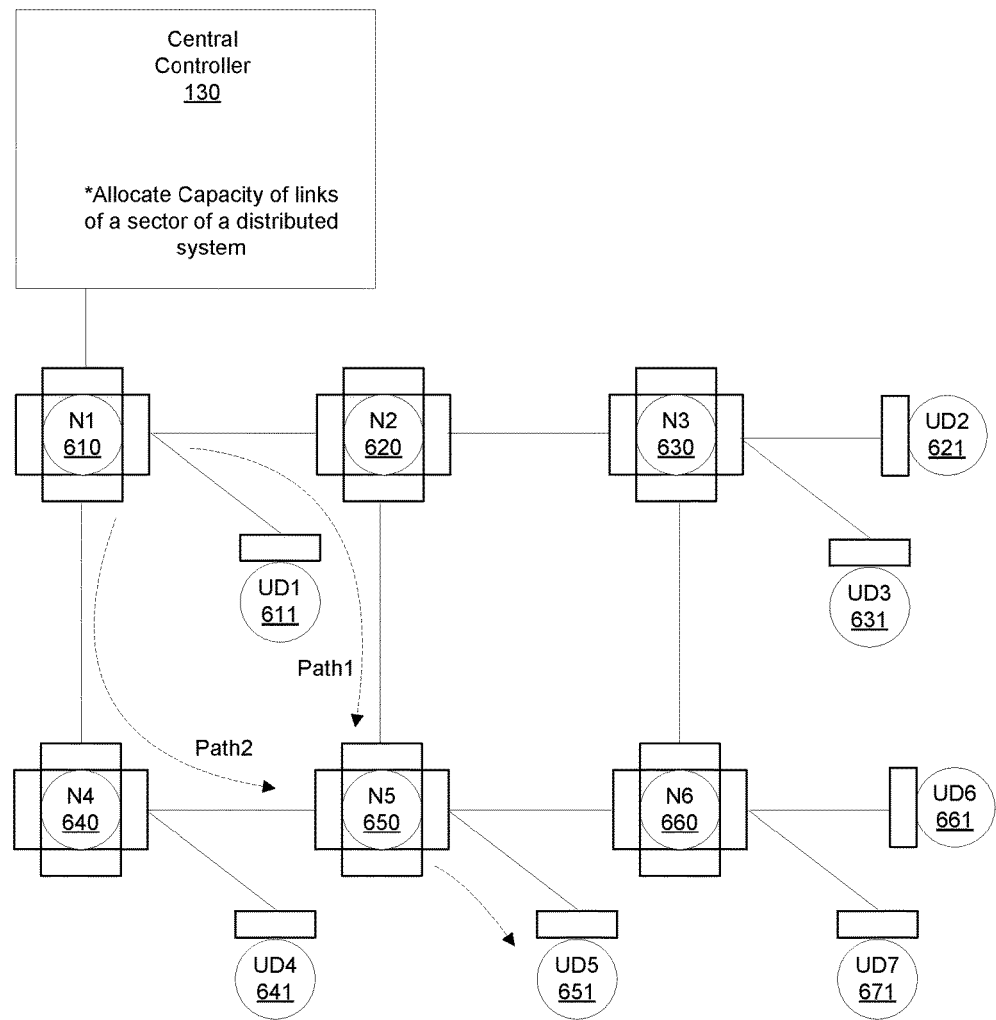
FIG. 6 shows a multi-hop wireless distributed system, according to another embodiment.

FIG. 6 shows a multi-hop wireless distributed system, according to another embodiment. As shown, the multi-hop network includes multiple routing paths to client devices. For at least some embodiments, selecting, by the central controller, the capacity allocation is further based on more than one routing path to a downstream device. As shown, a fifth client device (UD 5) 651 has multiple routing paths from sectors of the first node 610. That is, the UD5 651 receives data traffic through the two separate paths. One path from the first node 610 through the second node N2 620, and one from the first node N1 610 through the fourth node N4 620. For at least some embodiments, based on knowledge of the multiple paths to the downstream device UD5 651, the central controller is configured to influence the capacity allocation to account for the multiple routing paths available to the fifth client device UD5 651. A user device may have traffic demands that can be serviced or addressed through multiple paths from the sectors of the node to the user device. The central controller and/or the sector can account for these multiple paths during the selection and adjustment of the capacity allocation of the links of the sector. In particular, for an embodiment, the capacity allocation by the central controller is designed to ensure all user devices receive a fair allocation of capacity from the network. In FIG. 5, by exploiting paths 1 & 2 for user device UD5, the central controller ensures that each user device gets $10/35$ of the capacity available in the network. In contrast, if the multiple paths are not exploited by the central controller, some user devices (UD1 611, UD2 621, UD3 631) would get ⅓ of the capacity, while some user devices (UD4 641, UD5 651, UD6 661, and UD7 671) would each get ¼ of the capacity. Nodes N3 630 and N6 660 provide paths to the user devices (UD4 641, UD5 651, UD6 661, and UD7 671).

Figure 7:
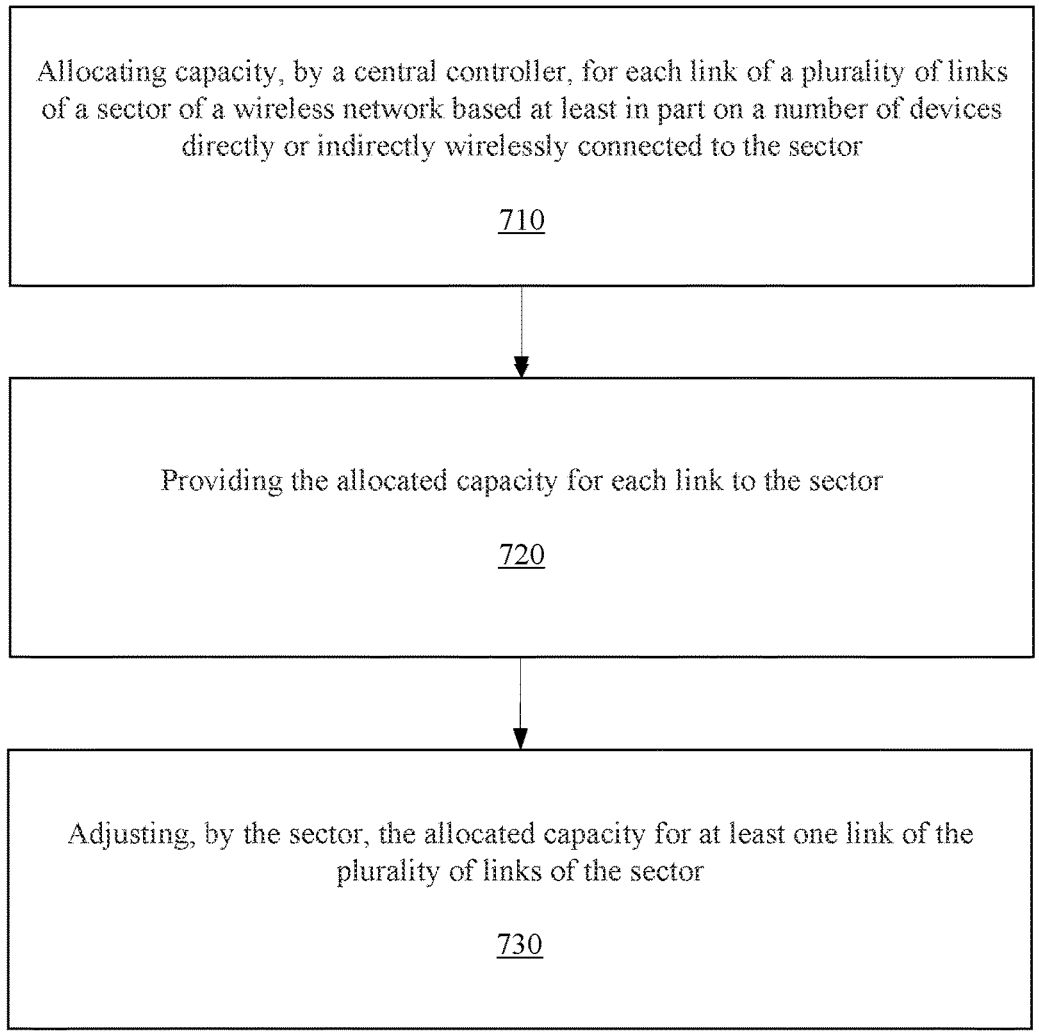
FIG. 7 is a flow chart that includes steps of a method of a central server allocating a capacity of a least one link of a sector, and the sector further adjusting the allocated capacity, according to an embodiment.

FIG. 7 is a flow chart that includes steps of a method of a hybrid node, according to an embodiment. A first step 710 includes allocating, by a central controller, a capacity for each link of a plurality of links of a sector of a wireless network based at least in part on a number of devices directly or indirectly wirelessly connected to the sector. A second step 720 includes providing the allocated capacity for each link to the sector. A third step 730 includes adjusting, by the sector, the allocated capacity for at least one link of the plurality of links of the sector. For at least some embodiments, the devices include downstream nodes, sectors, and/or client (user) devices.

For at least some embodiments, the allocated capacity includes at least one of a time allocation or a frequency allocation. As previously described, for at least some embodiments, the communication of the sector is scheduled. For an embodiment, the scheduled communication sets time and/or frequency blocks for transmission and reception of traffic through each of the links of the sector. For an embodiment, the sector receives the allocated capacity received from the central controller, and accordingly, the communication of traffic through the links is scheduled based on the selected allocated capacity. For an embodiment, the sector adjusts the allocated capacity by adjusting the scheduled time and frequency blocks of the scheduled communication of traffic through the links of the sector.

For at least some embodiments, the adjusting by the sector is performed based on network information available to the sector before network information is available to the central controller for allocation of the capacity. That is, for an embodiment, the sector senses an adjustment, to be made to the allocated capacity before the central controller determines a new capacity allocation. The sector responds more quickly to changes in conditions because the sector is connected to the links and is configured to sense or determine conditions that initiate an adjustment sooner than the central controller is configured to sense conditions that warrant a new capacity allocation. For an embodiment, a capacity allocation control loop is formed by the network information that is sensed and feedback to the central controller, and a capacity allocation adjustment control loop is formed by the network information sensed by the sector and used by the sector to adjust the capacity allocation. For an embodiment, a control loop bandwidth of the capacity allocation adjustment control loop is larger than a control loop bandwidth of the capacity allocation control loop. Accordingly, the capacity allocation adjustment control loop responds more quickly to changes in the wireless network than the capacity allocation control loop.

For an embodiment, the sector determines the network information it uses to adjust the allocated capacity directly at the sector, whereas the central controller determines the network information it uses elsewhere within the network. For an embodiment, the central controller provides coarse, slower responding allocations of the capacities of the links, wherein the adjusting by the sector is finer and faster. For at least some embodiments, the adjusting by the sector is more responsive than the selecting of the capacity by the central controller.

For at least some embodiments, the sector performs the adjusting in response to determining changes in conditions of traffic of the at least one link. That is, some types of traffic require more capacity than other types of traffic. For example, a user of a user device that is viewing video creates more capacity allocation demanding traffic than a user of a user device that is performing an interim, search. Accordingly, based on sensing the change in traffic conditions at the sector for supporting video versus an internet search, the sector adjusts the capacity allocation.

For at least some embodiments, selecting, by the central controller, the capacity allocation is further based on priorities of downstream users of the downstream devices. For example, user device priorities can be set to high, medium and low. The capacity allocation is influenced by the set priorities of the client devices. For at least some embodiments, the priorities are configured by the administrator (through a management interface) and thereby conveyed/known to the central controller. Accordingly, for an embodiment, the central controller computes capacity allocations and provides allocations similarly to the approach described above, using the 3-tuple. To make matters simple, for an embodiment, the sector is not allowed to use priorities directly to make adjustments.

For at least some embodiments, allocating, by the central controller, the capacity is further based on link qualities of one or more of the plurality of links at each sector. For an embodiment, the link qualities are measured. For an embodiment, the link qualities are predicted. The qualities of the links provide an indication of a rate that data, packets or traffic can be communicated through the link. That is, a better quality link will support a higher MCS (modulation and coding selection). Accordingly, the time and/or frequency allocation selected for a link can be influenced by the quality of the link.

For at least some embodiments, allocating, by the central controller, the capacity is further based on wireless hop counts between the sector and one or more downstream devices. The number of wireless hops between the sector and a device effects latency of data traffic to and from the device. For an embodiment, application of the selected capacity is influenced by the number of wireless hops between the sector and the device. For example, a node with more hops from the sector may be serviced more frequently, even with a set allocated capacity. That is, a device that is provided with an allocated capacity that is approximately the same as another device may be serviced more frequently than the other device to compensate for additional latency caused by the additional wireless hops to the device. So while the allocated capacity may be the same, the application of the allocated capacity may be different to compensate for the additional latency that may be caused due to a greater wireless hop count.

For at least some embodiments, allocating, by the central controller, the capacity is adaptive to types of traffic of each link. As previously stated, some types of traffic require more capacity than other types of traffic. For example, a user of a user device that is viewing video creates more capacity allocation demanding traffic than a user of a user device that is performing an internet search. In such cases, the central controller can allocate more capacity to video traffic than best effort traffic, thereby providing a form of Quality of Service (QoS) through differentiated capacity allocations based on traffic types.

For at least some embodiments, selecting, by the central controller, the capacity allocation is adaptive to changes in the traffic of one or more downstream devices. For an embodiment, when a change in traffic is sensed, the capacity allocation process is triggered. For an embodiment, traffic of links is monitored over time. Sensed variation in the traffic includes sensing deviations in the traffic that exceed a predetermined amount, thereby triggering a new selection in the capacity allocation of a link, or to adjust the capacity allocation of the link.

For at least some embodiments, selecting, by the central controller, the capacity allocation is adaptive to requests by one or more users of the devices. For an embodiment, the requests are for capacity allocation of uplink traffic. For an embodiment, the capacity allocation is adaptive to traffic sensed for one or more downstream users. This is true for downlink traffic, whereas for uplink traffic, the users of devices may explicitly make requests for traffic. For an embodiment, the capacity allocation accounts for traffic requests.

For at least some embodiments, wherein adjusting, by the sector, the capacity allocation for at least one link of the plurality of links of the sector is based on sensed traffic for one or more downstream devices. For an embodiment, if the sector senses the arrival rate of a user device's traffic has fallen below so that the capacity allocated to the user device cannot be fully utilized by the incoming traffic for that user, the sector exploits the unused capacity to serve traffic for one or more user devices that the sector senses require more capacity than that allocated to them by the central controller.

For at least some embodiments, adjusting, by the sector, the capacity allocation for at least one link of the plurality of links of the sector is based on queue state for the at least one link. That is, a link may be sectored into a plurality of queues, wherein each queue may have its own requirements. Therefore, the allocation selection becomes a queue dependent process rather than just a link dependent process.

For at least some embodiments, the queue state provides two pieces of information. First, the queue state includes an incoming rate of data traffic for a user device (Ingress Rate). Secondly, the queue state includes a current size of the queue (Queue Length) at that user device.

For an embodiment, selection of the capacity allocation by the central controller is influenced by queues of the links of the sectors, and air time is further allocated to queues of the links based on a number of hops of a device being serviced by the queue. For an embodiment, a queue is a FIFO buffer for packets of a certain memory size.

For at least some embodiments, adjusting, by the sector, the capacity allocation for at least one link of the plurality of links of the sector is based on a modulation and coding selection (MCS) of the at least one link. As previously described, the central controller may select the capacity allocation of a link of the sector based on a link quality. The selection can be based on longer-term (longer than a threshold of time) monitoring of the link quality. However, the sector can monitor the MCS over shorter-term (less than another threshold of time) periods, and adaptively adjust the capacity allocation of the link. For example, the sector can adjust the capacity allocation based on shorter-term effects, such as, fading due to moving objects. However, the central controller selects the capacity allocation based on longer-term effects. For example, the central controller may determine that certain effects on the link quality are repeatable over certain periods of time and the central controller can allocate the capacity based upon these certain effects.

For at least some embodiments, selecting, by the central controller, the capacity allocation is further based on more than one routing path to a downstream device. That is, for the embodiment of FIG. 6, the UD5 651 receives data traffic through the two separate paths. For at least some embodiments, based on knowledge of the multiple paths to the downstream fifth client device UD5 651, the central controller is configured to influence the capacity allocation to account for the multiple routing paths available to the fifth client device UD5 651. For example, the capacity of the link between the first node N1 620 and the fourth node N4 640 may be decreased due to the second path to the downstream device as provided by the link between the first node N1 620 and the second node N2 620.

For at least sore e embodiments, the capacity allocation of a link is selected and/or adjusted based on changes in routing of one or more downstream devices of the at least one link. For at least some embodiments, the downstream devices directly or indirectly wirelessly connected to the sector include downstream devices that are one or more wireless hops downstream from the sector. Routing may change number of downstream devices, but more importantly, for at least some embodiments, sensing the routing change triggers the selection of a new capacity allocation by the central controller.

As previously stated, for at least some embodiments, routing selections are performed for the devices (particularly downstream devices) connected or indirectly connected to a sector. That is, for a multi-hop network different paths (wherein a path includes multiple wireless hops) can be selected to indirectly connect the device to the sector. There are many different ways in which the routing can be accomplished. For example, the routing selections can be centralized or de-centralized. Different routing selections can result in different numbers of devices being directly and/or indirectly connected to the sector. Accordingly, the capacity allocation of the central controller for the sector should and eventually will change. For at least some embodiments, determination of a routing selection of devices directly or indirectly connected to the sector triggers the central controller to allocate the capacity of the sector. That is, for an embodiment, the central controller reselects the capacity allocations to links of the sector when routes from or through the sector change. The routes can change due to link failures and/or congestion.

For at least some embodiments, a routing tree is formed based on selected routes. For an embodiment, the central controller accesses the routing tree, and selects the capacity allocation for each link of the routing tree based at least in part on the number of downstream devices being served (have traffic routed) through the link.

Although specific embodiments have been described and illustrated, the embodiments are not to be limited to the specific forms or arrangements of parts so described and illustrated. The described embodiments are to only be limited by the claims.

What is claimed:

1. A method comprising:
   allocating, by a central controller, a capacity for each link of a plurality of links of a sector of a wireless network based at least in part on a number of devices connected to the sector through one wireless hop and connected to the sector through a plurality of wireless hops, wherein allocating the capacity includes allocating a frequency bandwidth available for use by each link of the plurality of links of the sector for wireless communication based on network information sensed and feedback to the central controller;
   providing the allocated capacity for each link to the sector; and
   adjusting, by the sector, the allocated capacity for at least one link of the plurality of links of the sector based on network information sensed by the sector and used by the sector to adjust the capacity allocation; wherein
   the adjusting of the allocated capacity is more responsive than the allocating of the capacity.

2. The method of claim 1, wherein the allocated capacity includes at least one of a time allocation or a frequency allocation.

3. The method of claim 1, wherein allocating the capacity, by the central controller, is triggered based on determining a change in routing of traffic through the sector.

4. The method of claim 1, wherein allocating the capacity, by the central controller, is further based on priorities of users of the devices.

5. The method of claim 1, wherein allocating the capacity, by the central controller, is further based on link qualities of one or more of the plurality of links at each sector.

6. The method of claim 1, wherein allocating the capacity, by the central controller, is further based on wireless hop counts between the sector and one or more downstream devices.

7. The method of claim 1, wherein allocating the capacity, by the central controller, is adaptive to types of traffic of each link.

8. The method of claim 1, wherein allocating the capacity, by the central controller, is adaptive to changes in the traffic of one or more downstream devices.

9. The method of claim 1, wherein allocating the capacity, by the central controller, is adaptive to requests by one or more users of the devices.

10. The method of claim 9, wherein the requests are for capacity allocation of uplink traffic.

11. The method of claim 1, wherein adjusting, by the sector, the allocated capacity for at least one link of the plurality of links of the sector is based on sensed traffic for one or more downstream devices.

12. The method of claim 1, wherein adjusting, by the sector, the allocated capacity for at least one link of the plurality of links of the sector is based on queue state for the at least one link.

13. The method of claim 1, wherein adjusting, by the sector, the allocated capacity for at least one link of the plurality of links of the sector is based on a modulation and coding selection (MCS) of the at least one for that link.

14. The method of claim 1, wherein allocating the capacity, by the central controller, is further based on more than one routing path to a downstream device.

15. A system comprising:
    a plurality of sectors, each sector comprising a transceiver for wirelessly communicating;
    a central controller, the central controller directly or indirectly connected to at least one sector of the plurality of sectors; wherein
    the central controller is operative to:
      allocated a capacity for each link of a plurality of links of a sector of a wireless network based at least in part on a number of devices connected to the sector through one wireless hop and connected to the sector through a plurality of wireless hops, wherein allocating the capacity includes allocating a frequency bandwidth available for use by each link of the plurality of links of the sector for wireless communication based on network information sensed and feedback to the central controller;
      provide the allocated capacity for each link to the at least one sector; and wherein the at least one sector is operative to:
      adjust the allocated capacity for at least one link of the plurality of links of the sector based on network information sensed by the sector and used by the sector to adjust the capacity allocation; wherein
      the adjusting of the allocated capacity is more responsive than the allocating of the capacity.

16. The system of claim 15, wherein the adjusting by the sector is performed based on network information available to the sector before network information is available to the central controller for selection of the capacity allocation.

17. The system of claim 15, wherein allocating the capacity, by the central controller, is triggered based on determining a change in routing of traffic through the sector.

18. The system of claim 15, wherein adjusting, by the sector, the allocated capacity for at least one link of the plurality of links of the sector is based on queue state for the at least one link.

19. A sector comprising:
    a transceiver for wirelessly communicating;
    a controller, the controller directly or indirectly connected to a central controller;
    the controller is configured to:
      receive an allocated capacity for each link of the sector, wherein the allocated capacity for the each link of a plurality of links of the sector is selected based at least in part on a number of devices connected to the sector through one wireless hop and connected to the sector through a plurality of wireless hops, wherein allocating the capacity includes allocating a frequency bandwidth available for use by each link of the plurality of links of the sector for wireless communication based on network information sensed and feedback to the central controller; and adjust the allocated capacity for at least one link of the plurality of links of the sector based on network information sensed by the sector and used by the sector to adjust the capacity allocation; wherein the adjusting of the allocated capacity is more responsive than the allocating of the capacity.

* * * * *